United States Patent
Del Gaizo et al.

(10) Patent No.: US 10,744,859 B2
(45) Date of Patent: Aug. 18, 2020

(54) METHOD FOR MITIGATING BACKGLASS CONTAMINATION

(71) Applicant: GM GLOBAL TECHNOLOGY OPERATIONS LLC, Detroit, MI (US)

(72) Inventors: Steven A. Del Gaizo, Madison Heights, MI (US); Danilo A. Oliveira, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 84 days.

(21) Appl. No.: 15/982,308

(22) Filed: May 17, 2018

(65) Prior Publication Data
US 2019/0351746 A1   Nov. 21, 2019

(51) Int. Cl.
*B60J 1/20*   (2006.01)
*B62D 35/00*   (2006.01)

(52) U.S. Cl.
CPC .......... *B60J 1/2008* (2013.01); *B62D 35/007* (2013.01)

(58) Field of Classification Search
CPC ...... B60J 1/2002; B60J 1/2008; B62D 35/007
USPC ................. 296/180.1, 180.3, 180.5
See application file for complete search history.

(56) References Cited

U.S. PATENT DOCUMENTS

| | | | | |
|---|---|---|---|---|
| 4,170,377 A * | 10/1979 | Ingram | ................ | B60J 1/2008 296/180.5 |
| 4,674,788 A * | 6/1987 | Ohmura | ................ | B60J 1/2008 296/180.5 |
| 6,273,488 B1 * | 8/2001 | Pike | ................ | B05D 5/083 296/91 |
| 8,998,294 B2 * | 4/2015 | Hori | ................ | B60S 1/58 296/180.5 |
| 2018/0251166 A1 * | 9/2018 | Escoffier | ............ | B62D 35/007 |

* cited by examiner

*Primary Examiner* — Jason S Daniels

(57) ABSTRACT

A method of mitigating rear end contamination of a vehicle while driving using an active spoiler system includes providing an active rear spoiler to a square back vehicle. Next, determinations are if the vehicle speed is greater than a predetermined threshold, if the rear end of the vehicle is contaminated, and if the vehicle wipers are on. The method then moves to deploying the active rear spoiler when the vehicle speed is greater than a predetermined threshold, the rear end is contaminated, and the vehicle wipers are on.

13 Claims, 4 Drawing Sheets

METHOD FOR MITIGATING BACKGLASS CONTAMINATION

TECHNICAL FIELD

The present disclosure relates to a method for mitigating rear end contamination of the vehicle while driving using an active spoiler system.

BACKGROUND

As illustrated in FIG. 1, Sport Utility Vehicles (SUVs) 10 and other square back type vehicles can experience rear end contamination 12 while being driven including, but not limited to, back glass and rear camera contamination. This contamination typically occurs through soiling contamination with water or dust. It is desirable to have a way to mitigate the rear end contamination issue while the vehicle is being driven.

SUMMARY

One or more exemplary embodiments described herein provide a method for mitigating rear end contamination of the vehicle while driving using an active spoiler system.

One aspect in accordance with an exemplary embodiment includes providing an active rear spoiler to a square back vehicle. Another aspect includes determining if the vehicle speed is greater than a predetermined threshold. And another aspect includes detecting if the rear end is contaminated. Still another aspect includes determining if the vehicle wipers are on. And yet another aspect includes deploying the active rear spoiler when the vehicle speed is greater than a predetermined threshold, the rear end is contaminated, and the vehicle wipers are on.

And further aspects in accordance with the exemplary embodiment wherein determining if the vehicle speed is greater than a predetermined threshold further includes using a vehicle speed sensor, and wherein deploying the active rear spoiler further includes using a linear actuator for outwardly extending a vane disposed in the active rear spoiler. Still another aspect wherein the outwardly extending vane creates a channel to redirect air onto the rear end for mitigating contamination. And other aspects include using rain sensing technology to determine if the rear end is being contaminated with rain, wherein determining if the rear end is contaminated with rain includes determining if the back glass and rear camera are being contaminated with rain. And yet another aspect employing an actuator switch for allowing an operator to selectively deploy the active rear spoiler. And one other aspect includes using a shutter for deploying the active rear spoiler when the vehicle speed is greater than a predetermined threshold, the rear end is contaminated, and the vehicle wipers are on.

The detailed description and the drawings or figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the figures to aid the reader's understanding, and do not represent limitations (for example, to the position, orientation, or use, etc.) on the scope of the disclosure, as defined by the appended claims.

Referring to the figures, wherein like numerals indicate like or corresponding parts throughout the several views, a method for mitigating rear end contamination of the vehicle while driving using an active spoiler system is provided.

Figure 2:
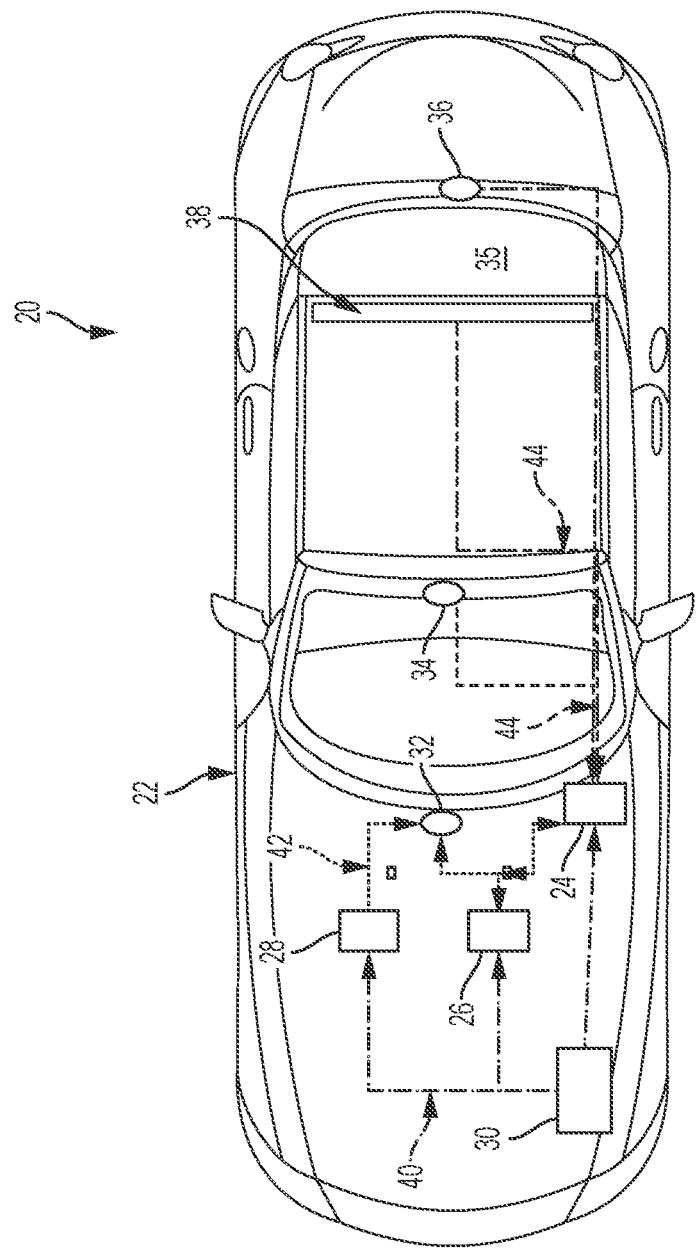
FIG. 2 is an illustration of a component diagram for mitigating rear end contamination of the vehicle while driving using an active spoiler system in accordance with an exemplary embodiment.

As best shown in FIG. 2, a graphical illustration of a vehicle system diagram 20 for mitigating rear end contamination of the vehicle while driving using an active spoiler system in accordance with an exemplary embodiment is provided. Rear end contamination refers to soiling due to rain, dust, or debris that may be disposed on the vehicle. It is appreciated that mitigating contamination to the vehicle rear end as well refers to mitigating contamination to rear end components including, but not limited to, the back glass and the rear camera 36.

The system 20 includes a vehicle 22 having electronic control units (24, 26, and 28) in electrical communication with a conventional 12-Volt battery 30. The control units include a body control module (BCM) 24, an engine control module (ECM) 26, and transmission control module (TCM) 28.

Figure 1:
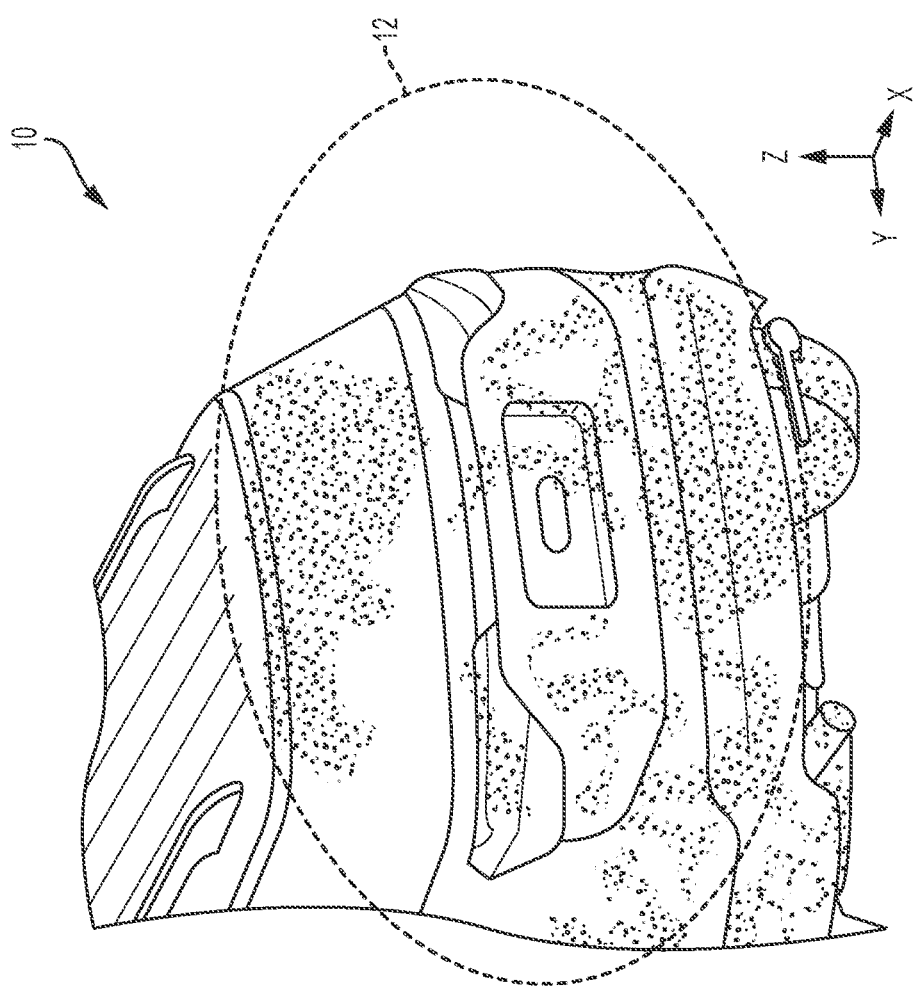
FIG. 1 is an illustration of a square back vehicle with exhibiting rear end contamination that may occur while driving.

Still referring to FIG. 1, the battery 30 is in electrical communication with the BCM 24, ECM 26, and the TCM 28 through an assortment of electrical wires 40 for providing power to the control modules (24, 26, and 28). The control modules (24, 26, and 28) are also interconnected using one or more network connections, such as a communications network 42 which allows the control modules (24, 26, and 28) to exchange information as necessary. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few. The rain sensing technology 34, rear camera 36, and active rear spoiler system 38 are in signal communication with the BCM 24 through conductors 44 suitable for transferring the respective sensed or control information to the BCM 24.

It is appreciated that another stand-alone control unit (not shown) may be used instead of the BCM 24 for receiving information from the vehicle speed sensor 32, rain sensing technology 34, and rear camera 36, as well as, for controlling operation of the active rear spoiler 38 in response to the information received from these devices.

Figure 3B:
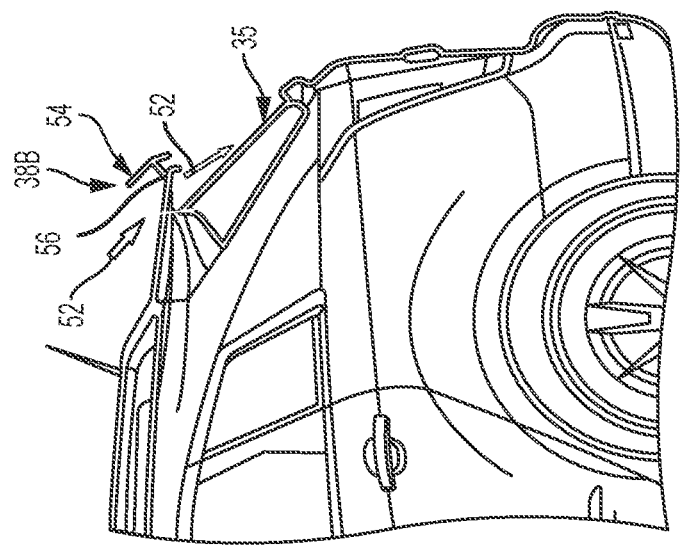
FIG. 3B is an illustration of a vehicle having a deployed active rear spoiler system in accordance with aspects of the exemplary embodiment.
Figure 3A:
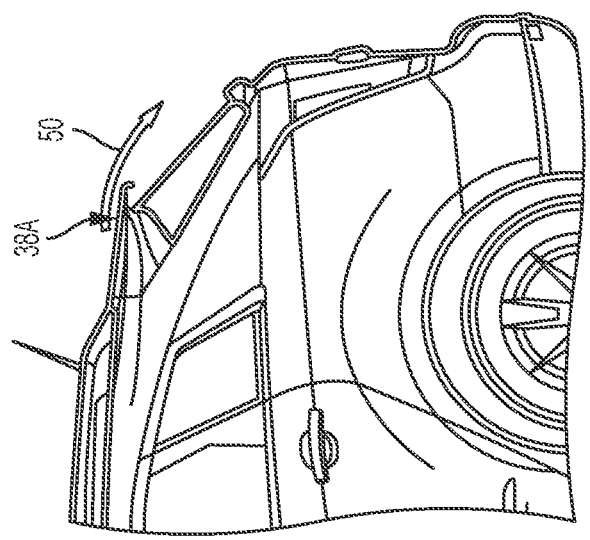
FIG. 3A is an illustration of a vehicle having an un-deployed active rear spoiler system in accordance with aspects of the exemplary embodiment.

Referring now to FIGS. 3A and 3B, illustrations of a vehicle having an un-deployed active rear spoiler system, and a vehicle having a deployed active rear spoiler system are provided, respectively. In FIG. 3A, the un-deployed active rear spoiler 38A can provide an aero dynamic benefit while driving as opposed to just having an air deflector disposed at the rear of the vehicle 22. Rear spoilers are known to be sensitive to aerodynamic performance thus having an active rear spoiler system 38A in accordance with aspects of the exemplary embodiment provides cross functional benefit of good aerodynamic performance as well as an innovative way to mitigate contamination on the rear end of the vehicle while driving. In the un-deployed position, the active rear spoiler 38A causes air to flow in a direction 50 such that drag is minimized as much as possible.

Referencing FIG. 3B, the active rear spoiler 38B is in the deployed position such that air flow 52 is re-directed through a channel formed between a vane 54 that is outwardly extended by an actuating mechanism 56 such as a linear actuator, hydraulic/pneumatic cylinder, solenoid driven linkage or other mechanisms suitable for such purpose. The air flow 52 travels through the channel such that it directed on the back glass 35 and possibly on the rear camera 36 to cause contamination, such as water, dust or other debris, to be blown off while the vehicle is being driven.

Figure 4:
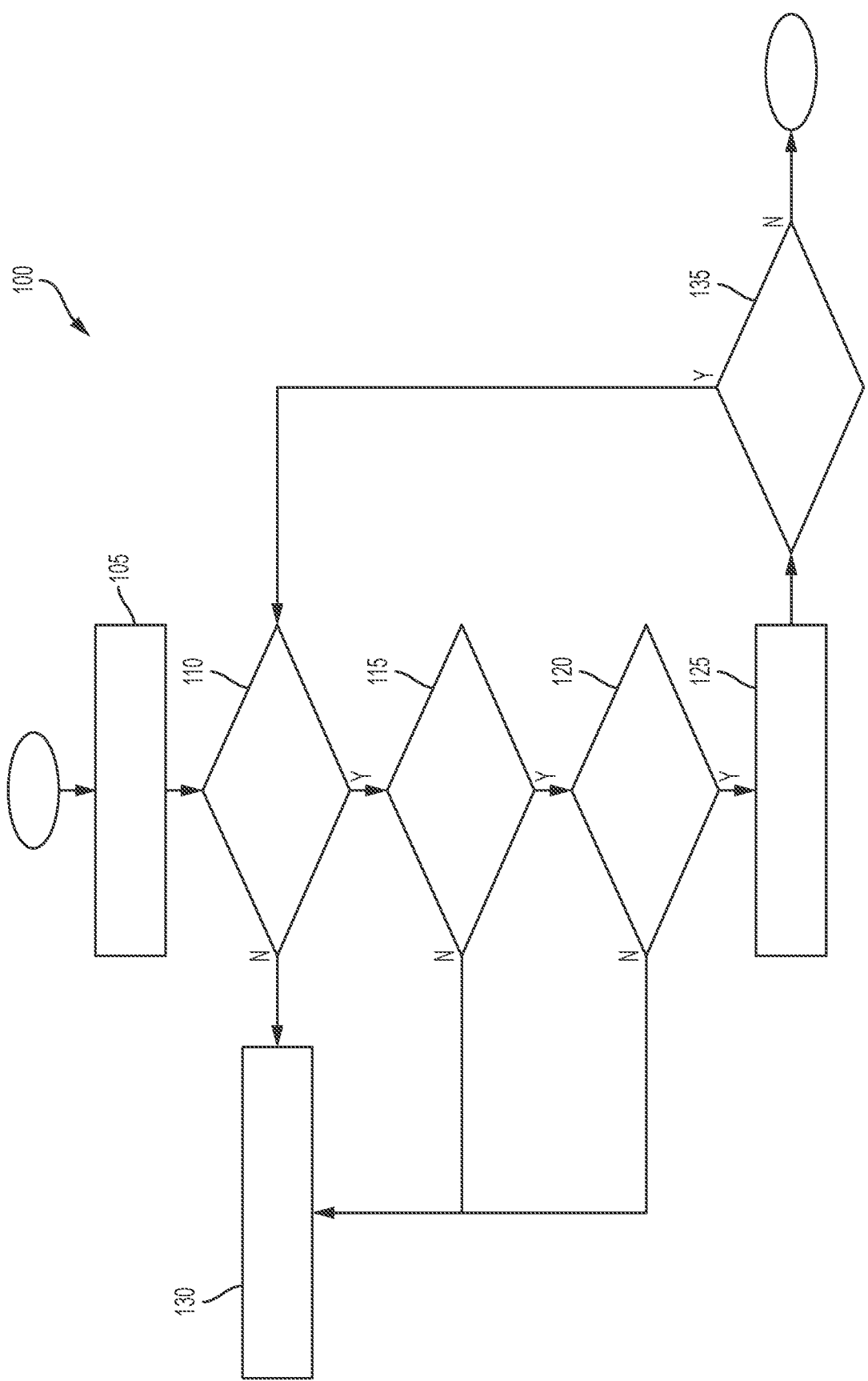
FIG. 4 is an illustration of an algorithm for the method for mitigating rear end contamination of the vehicle while driving using an active spoiler system in accordance with aspects of the exemplary embodiment.

Referring now to FIG. 4, an illustration of an algorithm for the method 100 for mitigating rear end contamination of the vehicle while driving using an active spoiler system in accordance with aspects of the exemplary embodiment is provided. The method begins at 105 with providing an active rear spoiler to a square back vehicle. Typically, the active rear spoiler system would be useful for square back vehicles such as SUVs but it is appreciated that the system may have application in other vehicles without exceeding the scope of the disclosure.

Next, at block 110, the method continues with determining if the vehicle speed is greater than a predetermined threshold, e.g., 35 mph. The system may also be configured to operate between a predetermined range of vehicle speeds, e.g., 35-70 mph, as a way to limit the maximum amount of drag caused by system. Continuing at block 115, the system operates to detect whether there is contamination, e.g., rain, dust, leaves, on the rear end of the vehicle, and at block 120, the system determines if the vehicle wipers are turned on. Through its communication link with the rain sensing technology and the vehicle wipers, the BCM can readily determine if these features are active.

At block 125, if the vehicle speed is greater than a predetermined threshold, the rear end is contaminated, and the vehicle wipers are on then the system deploys the active rear spoiler such that contamination on the rear end is mitigated. If either of the conditions for deployment are not met, i.e., the vehicle speed is not greater than a predetermined threshold, the rear end is not contaminated, and the vehicle wipers are not on, then the method moves to block 130 where the active rear spoiler will not be deployed.

At block 135, after performing the contamination mitigation deployment of the active rear spoiler, the method determines if the ignition is on. If so, then the method returns to block 110. If not, then the method ends.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of mitigating rear end contamination of a vehicle while driving using an active rear spoiler system comprising:
   providing an active rear spoiler to a square back vehicle;
   determining if the vehicle speed is greater than a predetermined threshold;
   detecting by way of a rear camera if the rear end is contaminated;
   determining if vehicle wipers of the vehicle are on; and
   deploying the active rear spoiler when the vehicle speed is greater than the predetermined threshold, the rear end is contaminated, and the vehicle wipers are on.

2. The method of claim 1 wherein determining if the vehicle speed is greater than the predetermined threshold further comprises using a vehicle speed sensor.

3. The method of claim 1 wherein deploying the active rear spoiler further comprises using a linear actuator for outwardly extending a vane disposed in the active rear spoiler.

4. The method of claim 3 wherein the outwardly extending vane creates a channel to redirect air onto the rear end for mitigating contamination.

5. The method of claim 1 further comprising using rain sensing technology to determine if the rear end is being contaminated with rain.

6. The method of claim 5 wherein determining if the rear end is contaminated with rain comprises determining if a back glass of the rear end is being contaminated with rain.

7. The method of claim 1 further comprising employing an actuator switch for allowing an operator to selectively deploy the active rear spoiler.

8. A method of mitigating rear end contamination of a vehicle while driving using an active spoiler system comprising:
   providing an active rear spoiler to a square back vehicle;
   determining if a vehicle speed is greater than a predetermined threshold using a vehicle speed sensor;
   detecting if the rear end is contaminated;
   determining if the vehicle wipers of the vehicle are on; and
   deploying the active rear spoiler when the vehicle speed is greater than the predetermined threshold, the rear end is contaminated, and the vehicle wipers are on.

9. The method of claim 8 wherein deploying the active rear spoiler further comprises using a linear actuator for outwardly extending a vane disposed in the rear spoiler.

10. The method of claim 9 wherein the outwardly extending vane creates a channel to redirect air onto the rear end for mitigating contamination.

11. The method of claim 8 further comprising using rain sensing technology to determine if the rear end is being contaminated with rain.

12. The method of claim 11 wherein determining if a back glass of the rear end is being contaminated with rain.

13. The method of claim 8 further comprising employing an actuator switch for allowing an operator to selectively deploy the rea active spoiler.

* * * * *